Nov. 7, 1967       A. C. FAATZ, JR., ET AL       3,351,564
CONTROL OF CATALYTIC METHANATION UNIT
Filed March 14, 1966                    3 Sheets-Sheet 3
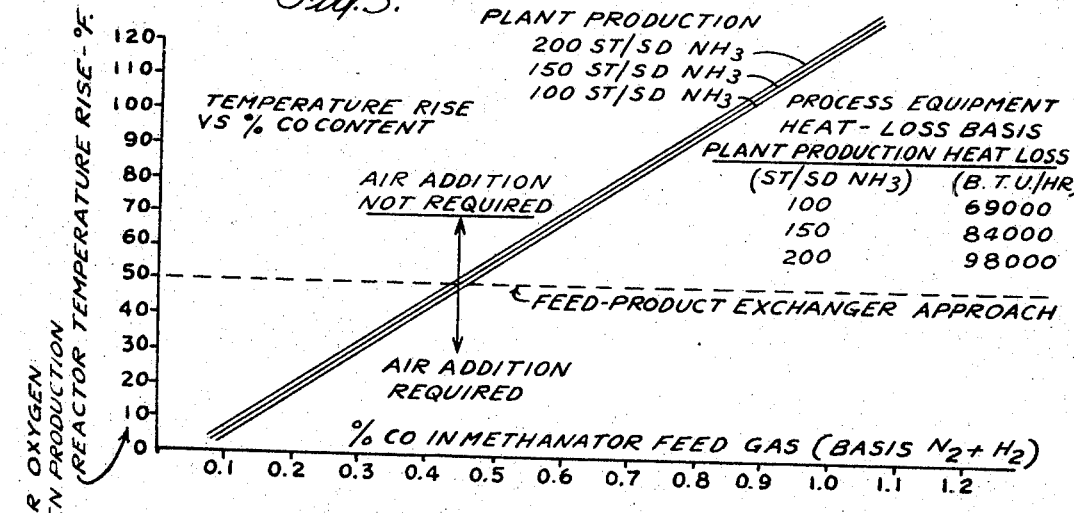
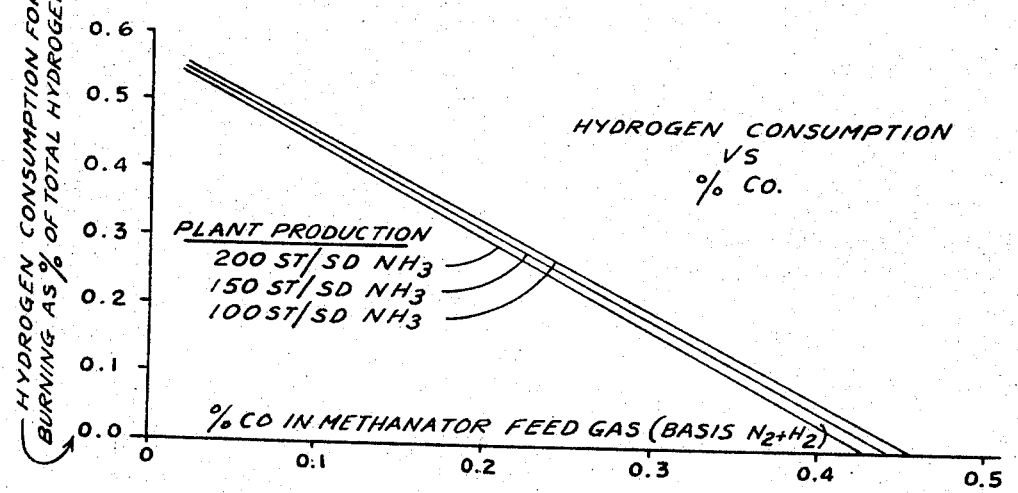
INVENTORS
ALBERT C. FAATZ, JR.
EARL BRUCE POWELL
BY
Richard H. Thomas
ATTORNEY

# United States Patent Office 3,351,564
Patented Nov. 7, 1967

3,351,564
CONTROL OF CATALYTIC
METHANATION UNIT
Albert C. Faatz, Jr., Montclair, and Earl B. Powell, Chatham Township, N.J., assignors to Foster Wheeler Corporation, New York, N.Y., a corporation of New York
Filed Mar. 14, 1966, Ser. No. 534,236
6 Claims. (Cl. 252—377)

ABSTRACT OF THE DISCLOSURE

A process involving catalytic methanation of a synthesis feed gas containing hydrogen and small amounts of carbon monoxide and carbon dioxide wherein oxygen is added to the feed gas for exothermally reacting with a portion of the hydrogen raising the temperature of the effluent gas of the methanation reaction to a temperature sufficient for effective heat exchange with the feed gas.

---

This application is a continuation-in-part of United States Ser. No. 257,676, filed Feb. 11, 1963.

This invention relates to a catalytic gas synthesis process involving a reaction which is exothermic in character, and in particular to improvements in the process for the recovery or utilization of heat.

A specific example of the invention is in a methane synthesis reaction involving the catalytic reaction of hydrogen with oxides of carbon, which reaction occurs with a release of heat.

In this respect, the more common methanation catalysts require that the gas flowing into the catalytic reactor be heated to a high temperature, fixed by the inherent activity of the catalyst, before the reaction can occur. Since the reaction is exothermic, the product gas, at a higher temperature relative to the feed gas, offers a natural source of heat for this purpose. It is found, however, that in actual practice, the temperature difference between the gas flowing into the reactor and the product gas from the reactor is often no more than 20° to 30° F., partly because of a low heat release under reaction conditions and partly because of heat losses.

It is generally accepted that to effect an efficient heat exchange between gases, the temperature difference of the gases should be not less than about 50° F., and the 20° to 30° F. difference is obviously insufficient. Further, in certain processes, a 75° to 100° F. difference in temperature may be required for optimum efficiency.

In an ammonia synthesis gas process, the oxides of carbon are poisonous to the ammonia converter catalyst, and one commercial practice is to remove the carbon oxides from the synthesis gas by the catalytic methanation reaction. If the carbon monoxide and carbon dioxide (CO and $CO_2$) content in the synthesis gas is high, the heat from the reaction may be expected to raise the gas temperature 50–60° F., allowing for heat loss, above the feed gas temperature. However, in the process for the preparation of an ammonia synthesis gas, it is a prime objective to reduce the combined carbon monoxide and carbon dioxide level in the synthesis gas before methanation to a minimum value. The reasons for this are that the reaction of carbon monoxide and carbon dioxide with hydrogen ($H_2$) destroys substantial amounts of the latter, desired for the ammonia gas reaction, and that the methane ($CH_4$) so produced causes hydrogen losses as purge gas from the ammonia synthesis loop.

Frequently the carbon monoxide and carbon dioxide content is reduced to a level of about 0.1–0.3 mol percent in the dry synthesis gas, and this results in little temperature rise in the methanator vessel. Accordingly, it becomes necessary to provide a different or supplementing source of heat for the feed gas. For this purpose, it has been proposed to provide for heat exchange with other process streams at suitable temperatures, or to heat electrically the feed gas. Other alternatives are to preheat the gas in a fired heater, or bring it into heat exchange with superheated steam. In each instance, the alternative has represented high equipment costs, inefficient use of high temperature process heat, high utility cost, and/or difficult temperature control.

By the invention, it was discovered that the temperature of the product gas could be accurately raised to the desired level in an economical manner by adding controlled amounts of air or oxygen into the methanator reactor vessel, for the following reaction:

$2H_2 + O_2 = 2H_2O + 210,000$ B.t.u./lb. mol. (approx.) [1]

[1] Where the reaction takes place at about 600° F.

A principle advantage of the invention resides in the accurate control over the product gas temperature which may be achieved. In addition, the invention results in a substantial reduction in equipment costs. The reaction is conducted within the catalytic reactor, and all of the heat produced is made available for raising the temperature of the product gas, thus making the system thermally more efficient than a system requiring external heating with steam, electric current, or a fuel. Further, the reaction is conducted with only a minimal consumption of ammonia reactor feed gas. For instance, for equal quantities of heat released, oxidation of the hydrogen destroys only one-third as much hydrogen as methanation. An additional advantage is that the reaction adds no inerts to the ammonia synthesis gas feed incurring additional purge losses in the reactor loop.

For the reaction between hydrogen and oxygen ($O_2$) and the production of heat, a catalyst is required for promoting the oxidation reaction. The catalyst may be disposed in the same reactor vessel with the methanation catalyst adjacent the feed point for oxygen in the vessel, or the catalyst used for methanation may also be used for this purpose if it is effective in the oxygen-hydrogen reaction. The rate of admission of air or oxygen into the vessel is controlled by the desired temperature level for the product gas, which in turn is a function of the combined heat release for the methanation and oxidation reactions.

The invention and advantages thereof should become apparent on consideration of the following description, by way of example, and with reference to the accompanying drawings, in which:

FIGURE 3 is a graph showing temperature rise degrees F. vs. mol percent carbon monoxide in the methanation unit of FIG. 1; and FIGURE 4 is a graph showing hydrogen consumption for oxygen burned in the methanation unit of FIG. 1 as a percentage of total hydrogen production vs. mol percent of carbon monoxide.

In the preparation of an ammonia synthesis gas, the process may follow a sequence which includes: (1) primary reforming or reacting of gaseous hydrocarbons with steam in an externally-heated, catalyst-containing tube; (2) secondary reforming by addition of air to the product gas from the primary reformer, and passage of the mixture through a catalyst bed, the effect being oxidation of a portion of the residual hydrocarbons from the primary reformer; (3) shift conversion of carbon monoxide and steam to hydrogen plus carbon dioxide with or without further addition of steam in a catalyst reactor; (4) substantially total removal of carbon dioxide by scrubbing with monoethanolamine; (5) methanation of trace carbon monoxide; and (6) synthesis of ammonia.

As indicated above, it is important in this sequence of steps to have a low carbon monoxide content in the methanator feed gas. One reason for this is that the ammonia synthesis gas reaction requires a ratio of hydrogen to nitrogen of 3:1, but the methanation reaction effects an undesired consumption of hydrogen as follows:

$$CO + 3H_2 = CH_4 + H_2O$$

wherein the carbon monoxide, which is a catalyst poison in the ammonia synthesis reaction, is converted to the non-poisonous methane. At the same time, any carbon dioxide which leaks through the MEA system is converted to methane by the reaction:

$$CO_2 + 4H_2 = CH_4 + 2H_2O$$

for a further undesirable consumption of hydrogen.

In addition to the consumption of hydrogen, the methane is an insert in the ammonia synthesis reaction and requires purging, resulting in purge losses of synthesis gas.

For these reasons, the carbon monoxide concentration in the feed gas is reduced as far as possible, prior to methanation, to a mol percent of about 0.1 to 0.3 on a dry, carbon dioxide-free basis.

Figure 1:
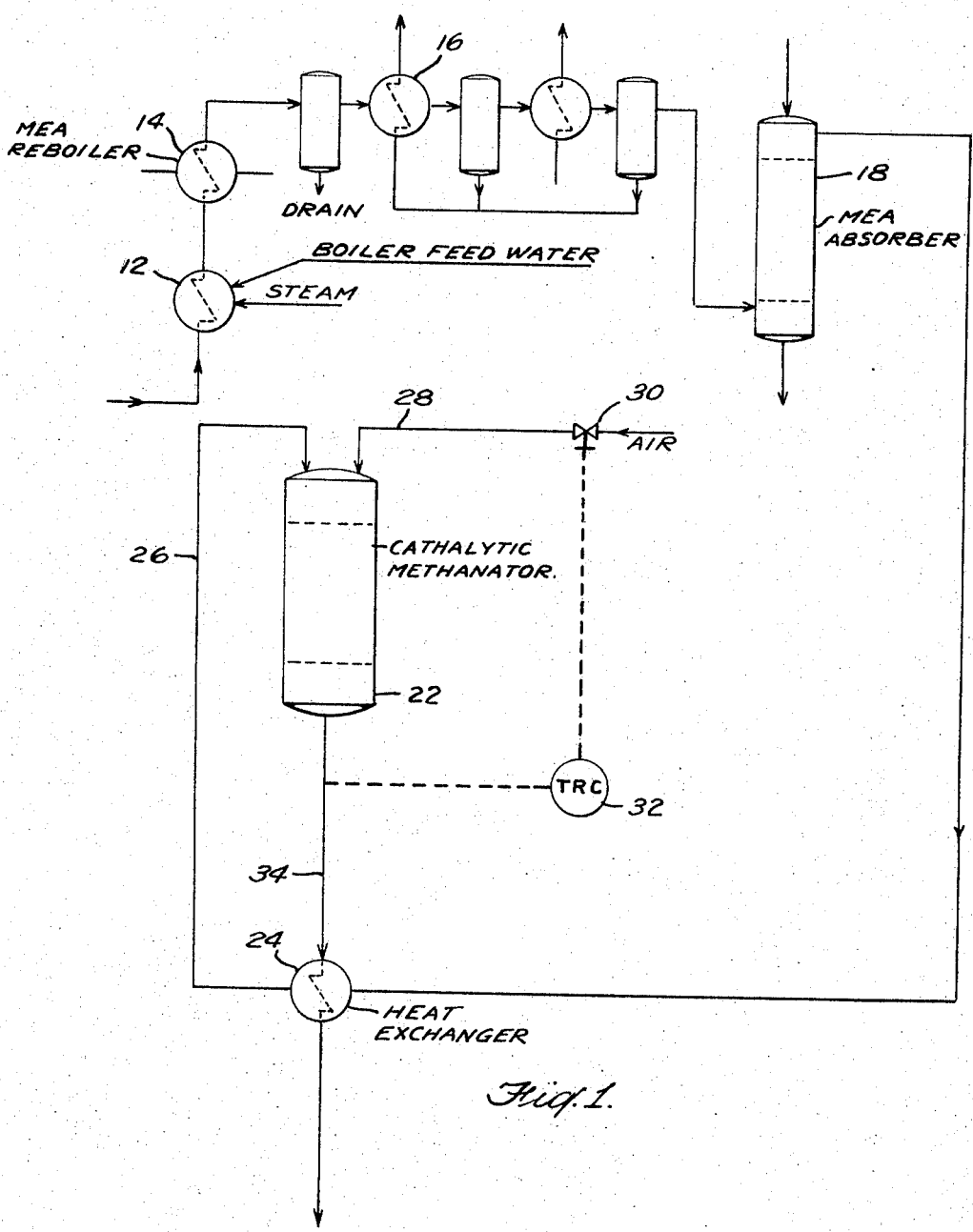
FIGURE 1 illustrates a typical flow diagram of part of a system for the preparation of an ammonia synthesis gas (a hydrogen-nitrogen mixture), which includes a catalytic methanation unit in accordance with the invention.

FIG. 1 illustrates the process in accordance with the invention following the shift conversion stage. The product synthesis gas, which contains hydrogen, nitrogen ($N_2$), carbon dioxide, water ($H_2O$) and some carbon monoxide, and which is at a temperature of from 700° to 800° F. and a pressure of about 300 p.s.i.a. (future operating levels may be higher), is passed through a waste heat boiler 12, an MEA (monoethanolamine) reactivator reboiler 14, and a boiler feed-water preheater 16, wherein the gas is cooled to a temperature sufficient to condense out or remove much of the water. The product synthesis gas is then passed in counter-current flow with a monoethanolamine solution through a scrubber 18, for removal of carbon dioxide. At this point, it may be desired to compress the synthesis gas to take advantage of better catalyst performance at higher pressure. Also, the temperature at this point, contingent on prior process steps, may be from 80° F. to about 120° F. Depending on the activity of the methanation catalyst, the methanation reaction may require a feed gas temperature in the range of 300°–600° F., but substantially higher than that of the feed gas.

Accordingly, prior to feeding the synthesis gas to the catalytic methanation reactor 22, it is passed in heat exchange with the methanator product gas through exchanger 24 for the purpose of bringing the synthesis gas as close to required reactor feed gas temperature as is economically practicable. In a conventional unit, the temperature of the methanator product gas is insufficient, because of the low carbon monoxide level and heat losses in the reactor vessel, to raise the synthesis feed gas at this point (i.e., the output from the heat exchanger) to the desired level.

For instance, it may be necessary that the feed gas to the methanator be 500° F. in order to initiate the methanation reaction. Because of the low carbon monoxide content of the gas, the temperature of the methanator product gas will be only 520°–530° F., 20°–30° F. higher than the feed gas temperature. In the heat exchanger, the synthesis gas from the MEA absorber, at a temperature level of from 80°–120° is raised only to about 470°–480° F., 50° F. below the product gas temperature. Accordingly, additional heat must be supplied to the gas to bring it up to a temperature of 500° F.

With a carbon monoxide content of about 0.1 mol percent, the heat output of the reaction may be sufficient to do little more than compensate for heat losses in the reactor vessel. Further, economics may dictate that the gas temperature difference in the heat exchanger be as much as 100° F. If such were the case the MEA absorber product gas would be raised only to a temperature of 400° F.

In conventional systems, additional heat is supplied by one of several ways. For instance a second heat exchanger may be placed in the methanator feed line 26 by which the feed gas to the methanator is passed in heat exchange with the synthesis gas from the shift converter, the latter being at about 700°–800° F. However, this necessitates additional equipment, and it introduces complications to control the heat input to the feed gas or the final feed gas temperature. For instance, a higher temperature in line 26 may be required as the catalyst in the vessel 22 becomes inactive with time. Other such changes in operating conditions in the shift converter will modify the temperature of the gas from the shift converter, and complicated by-pass controls may be required for compensation. Similar difficulties are presented with other conventional arrangements.

Another means for accomplishing the required heat release in the reactor is deliberately to maintain abnormally high levels of carbon monoxide in the reactor feed gas. This is effective but inefficient, since not only is hydrogen converted to methane and thereby lost from the synthesis mixture, but also the carbon monoxide could have, under normal circumstances been "shifted" to hydrogen, increasing thereby the total amount of hydrogen available in the methanation reactor feed gas. Thus, for every extra unit of carbon monoxide introduced into the reactor solely for the purpose of producing heat release, four units of hydrogen become unavailable for ammonia synthesis.

In accordance with the invention, a feed line 28 is connected to the catalytic methanator and to a source by which compressed air or oxygen is introduced into the methanator vessel. A valve 30 is provided in the line, to regulate the air flow rate, and preferably is controlled by a temperature recorder and control means 32 attached to the output line 34 of the methanator. The air may be preheated before introducing it into the methanator.

Figure 2:
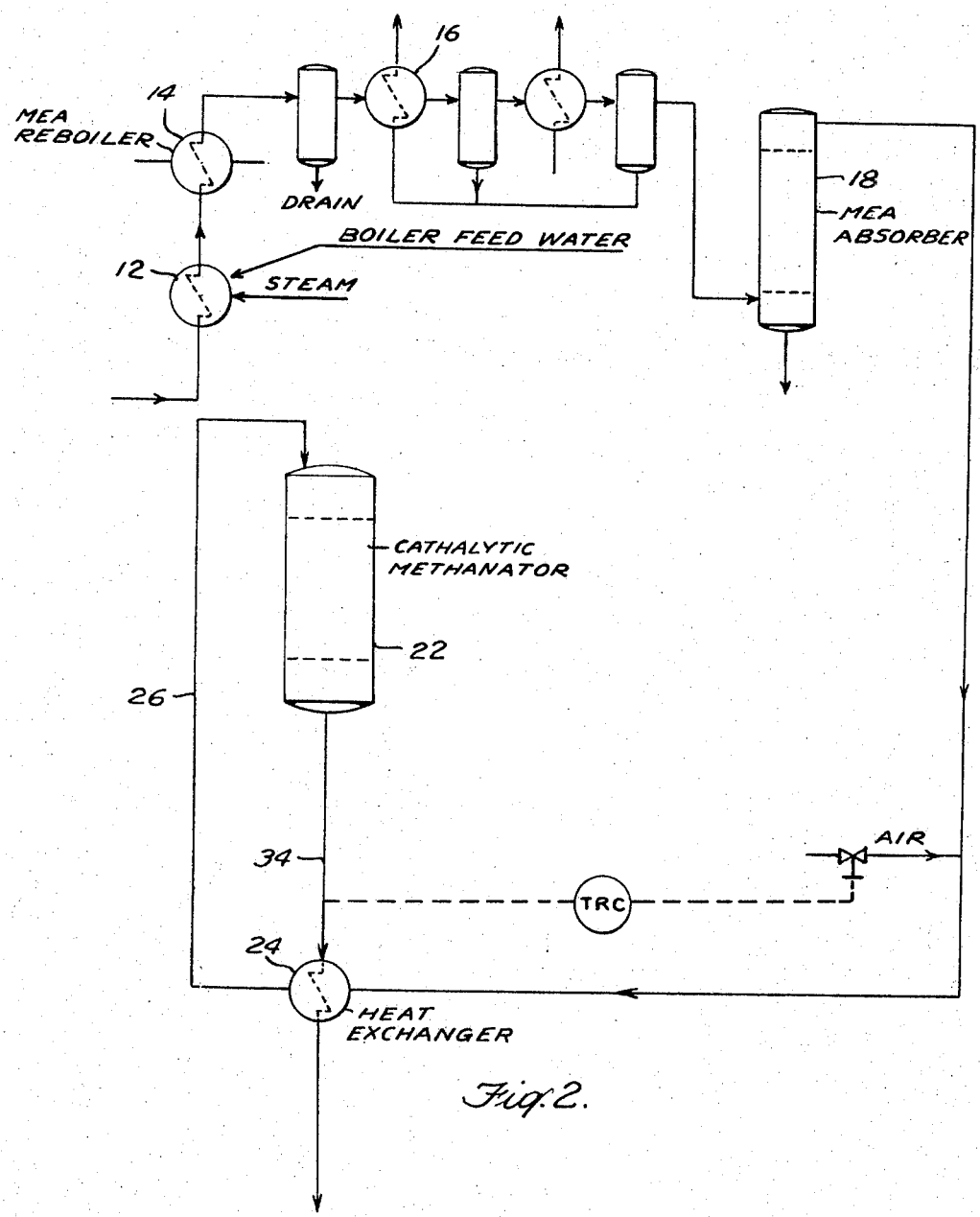
FIGURE 2 is a flow diagram showing an embodiment of the invention and an alternative point for the introduction of oxygen.

For this purpose, FIG. 2 illustrates an embodiment of the invention where the air or oxygen is added at a point upstream of or prior to passage through the exchanger 24. This eliminates the need of a separate exchanger for preheating the air or oxygen, but in addition achieves better mixing of the oxygen with the feed gas. Also, preheating the air in exchanger 24 reduces the heat release requirement in the vessel 22. It should be noted, however, that the reaction of hydrogen and oxygen upstream of the vessel 22 should be avoided.

The oxygen or air undergoes the following reaction with the hydrogen:

$$2H_2 + O_2 = 2H_2O + 210{,}000 \text{ B.t.u./lb. mol (approx.)}$$

To raise the methanator feed gas to a temperature of 300° to 600° F., the temperature range in which most methanation catalysts are active, the product gas temperature from the methanator should be from 350°–650° F., or higher. In actual practice, depending on the catalyst and process, it may be found that raising the temperature of the product gas to 75°–100° F. above the desired temperature of the feed gas will prove to be more economical. In any event, it is apparent that by controlling the air input through valve 30, the temperature level for the feed gas in line 26 can be accurately controlled.

The invention and advantages thereof become even more evident with reference to FIGS. 3 and 4.

In FIGURE 3 the effect of the carbon monoxide concentration in the feed gas on the temperature rise in the reactor is illustrated, when account is taken of allowance for heat loss from the reactor system. The illustration is shown for several different sizes of ammonia synthesisgas preparation units in terms of equivalent ammonia capacity, in the range 100 short tons per stream day (100 ST/SD) to 200 ST/SD, with heat-loss allowance in the range 69,000–98,000 B.t.u./hour. This figure shows that, if the carbon monoxide content is reduced below about 0.45 percent, the temperature rise in the reactor is insufficient to allow the reactor product gas to exchange heat into the feed gas unless exchanger 24 were designed for temperature approaches closer than 50° F. Similarly, a design of exchanger 24 with a 100° F. temperature approach would require that the carbon monoxide content not fall below 0.9%. When the carbon monoxide content of the feed gas is very low (less than 0.2%), the required temperature approach for exchanger 24 would become impractically low (5°–15° F.)

To raise the temperature difference between the feed and product streams to levels for practicable design of exchanger 24, additional heat can be liberated within reactor 22 by addition of air or oxygen, resulting in combustion of hydrogen to steam. FIG. 4 illustrates the loss of hydrogen resulting from this combustion, for the specific case where exchanger 24 is designed for a 50° F. temperature approach. It will be noted that a carbon monoxide level of 0.2% requires the consumption of about 0.3% of the hydrogen in the feed gas. By way of comparison, if the carbon monoxide had been (deliberately) held at the self-sustaining level of 0.45%, the hydrogen loss equivalent to the extra 0.25% of carbon monoxide would have been about 1.0%. Thus, the use of air or oxygen to produce the heat of reaction is more efficient in terms of hydrogen consumption than the use of carbon monoxide.

It is apparent from the above that the equipment and piping costs required for heat exchange of the feed gas with other process streams at suitable temperatures are eliminated. The use of air usually does not represent added costs, nor, often, does the use of oxygen. Costs for electric heating, or preheating in a fired heater, or heat exchange with superheated steam, are avoided. It is contemplated that the cost of preheating the methanator feed gas by conventional means may add to the cost of the equipment and piping to such a degree as to render the overall use of process heat thermally less efficient than may be possible if methanator feed gas "trim" preheat were not necessary. The present invention has the additional advantage of rendering the use of process heat thermally efficient.

EXAMPLE

A typical example of preparation of ammonia synthesis gas provides an illustration of the benefits to be derived from the invention.

In a plant designed to produce a mixture of hydrogen and nitrogen, in the volumetric proportions 3:1, for the production of 150 short tons per day of synthetic ammonia, the residual concentrations of carbon oxides (CO and $CO_2$) in the gas mixture are reduced to essentially zero (actually a zero volume parts per million are permitted) by catalytic methanation. The gas mixture was first passed through a shift converter where CO was reacted with water vapor, and then through a system to remove the $CO_2$. The gas reaching the catalytic methanation reactor is as follows, the composition shown representing the condition when the shift-conversion catalyst is fresh and possesses optimum efficiency:

| Gas mixture component: | Lb. mols per hour |
|---|---|
| A | 5.0 |
| $N_2$ | 388.4 |
| $H_2$ | 1183.6 |
| CO (0.1 vol. percent) | 1.6 |
| $CO_2$ | 0.2 |
| $CH_4$ | 4.5 |
| $H_2O$ | 6.7 |
| | 1590.0 |

After a period of operation, the shift-conversion catalyst may be expected to lose some activity, and a gas mixture having a higher level of CO concentration, as illustrated below, may be expected:

| Gas mixture component: | Lb. mols per hour |
|---|---|
| A | 5.0 |
| $N_2$ | 388.4 |
| $H_2$ | 1180.4 |
| CO (0.3 vol. percent) | 4.8 |
| $CO_2$ | 0.2 |
| $CH_4$ | 4.5 |
| $H_2O$ | 6.7 |
| | 1590.0 |

This gas mixture is preheated to 600° F., in a manner illustrated in FIG. 1, by heat exchange with the product gas from the catalytic methanation reactor. It is desired that the product gas from the reactor be at a temperature of 650° F. in order to produce suitable design conditions for the heat exchanger. Typical catalysts for the catalytic methanation reaction are "G-33" (trademark) manufactured by Girdler Catalysts, "C 13" (trademark) manufactured by Catalysts and Chemicals, Inc., or "11-1" (trademark) manufactured by Imperial Chemical Industries, Ltd.

These methanation catalysts, which are well known, are nickel or nickel oxide, and vary in such respects as type of carrier and method of preparation to obtain longer life and improved stability. Iron and cobalt and their oxides are also known as catalysts for this reaction.

At the temperature level in the reactor, the heat release from the methanation reactions, the exothermic heats of reaction for CO and $CO_2$ reacting with $H_2$ to form $CH_4$ and $H_2O$, and the corresponding temperature rises in the gas mixtures, are calculated as follows:

| CO Concentration (vol. percent) | 0.1 | 0.3 |
|---|---|---|
| Heat of Reaction (B.t.u./Hr.) | 165,000 | 465,000 |
| Heat Loss (B.t.u./Hr.) | 84,000 | 84,000 |
| Net Heat (B.t.u./Hr.) | 81,000 | 381,000 |
| Temperature Rise in Reactor (° F.) | 7 | 34 |

To achieve a temperature rise of 50° F., additional heat is generated in the reactor, by the addition of air in a manner illustrated in FIG. 2, the heat being generated by oxidation of $H_2$ with $O_2$ to form water vapor. The C 13 methanation catalyst (nickel) is one that may be used to promote this reaction between hydrogen and oxygen, and accordingly, as an aspect of the invention, the same catalyst bed may be used to promote both reactions. Some noble metal catalysts such as platinum, palladium, or mixtures thereof are also used for the hydrogen-oxygen reaction, so that if desired separate catalyst beds can be used. The results of the air addition are shown below:

| CO Concentration (vol. percent) | 0.1 | 0.3 |
|---|---|---|
| Oxidation Heat Required (B.t.u./Hr.) | 481,000 | 181,000 |
| $O_2$ Required (Lb. Mols/Hr.) | 2.32 | 0.87 |
| $H_2$ Oxidized (Lb. Mols/Hr.) | 4.64 | 1.74 |
| $H_2$ Loss by Oxidation (percent) | 0.39 | 0.15 |

Although a loss of feed $H_2$ is sustained by this oxidation process, the loss is much less than that which would result if the CO content were permitted (e.g. by operation of the shift converter at less efficient conditions) to reach the level necessary to provide the required heat of reaction. In this example, the required CO in the feed gas would be 6.7 lb. mols per hour, and the loss of $H_2$ resulting from the less efficient shift conversion and the increased methanation reaction would result in incremental H₂ losses as follows:

| CO Concentration (vol. percent) | 0.1 | 0.3 |
|---|---|---|
| Incremental H₂ Loss: | | |
| Lb. Mols/Hr | 20.4 | 7.6 |
| Percent | 1.76 | 0.64 |

This example shows that it is more efficient, from the standpoint of hydrogen recovery, to produce the catalytic methanation reactor internal heat requirement by oxidtion of hydrogen than by methanation of carbon monoxide.

Many modifications will be apparent to those skilled in the art. For instance, the oxygen may be mixed with the feed gas during methanation, subsequent to methanation, or prior to methanation. Also, the layout of the reactor vessel is a matter of design, and location of the feed lines and catalyst beds may be varied. In most instances, the methanation catalyst will catalyze the hydrogen-oxygen reaction. In certain special cases, a special oxidation-promoting catalyst may be used admixed with or separate from the methanation catalyst. Other modifications will be apparent, and the invention is to be limited only as defined in the following claims.

What is claimed is:

1. In a process involving a catalytic methanation reaction in a reaction vessel of a synthesis feed gas containing hydrogen and a small amount of carbon monoxide or carbon dioxide wherein the feed gas must be at a high temperature to initiate the reaction, and wherein the temperature level is achieved in part by heat exchange of the effluent gas from the reaction vessel with the feed gas, a small amount of carbon monoxide and carbon dioxide being defined as an insufficient amount to raise the temperature of the effluent gas to at least 50° F. above the temperature of the feed gas, the improvement comprising the steps of exothermally burning a portion of the hydrogen in the feed gas with a controlled amount of an oxygen containing gas to raise the temperature level of the effluent gas from the reaction vessel, and passing the effluent gas in heat exchange with the feed gas, the amount of oxygen added being sufficient to raise the temperature level of the effluent gas at least 50° F. above the temperature of the feed gas.

2. In a process involving a catalytic methanation reaction according to claim 1, wherein the carbon monoxide and carbon dioxide content is less than 0.3 mol percent of the feed gas.

3. In a catalytic methanation process in a reactor vessel of an ammonia synthesis feed gas containing hydrogen, nitrogen, and from 0.1 mol percent to 0.3 mol percent of carbon monoxide, wherein the hydrogen is catalytically reacted with the carbon monoxide at a pressure of about 100–400 p.s.i.a. and a temperature of from 300°–600° F. to produce methane, the improvement comprising the steps of introducing a controlled amount of an oxygen containing gas into the reactor vessel catalytically to burn a portion of hydrogen whereby the temperature level of the effluent gas following the methanation reaction is raised, passing the effluent gas in heat exchange with the feed gas, the amount of oxygen containing gas added being sufficient to raise the temperature level of the effluent gas at least 50° F. above the temperature of the feed gas.

4. In a catalytic methanation process in a reactor vessel of an ammonia synthesis feed gas containing hydrogen, nitrogen, and a small amount of carbon monoxide, wherein the hydrogen is catalytically reacted with the carbon monoxide at a high pressure and a temperature of from 300°–600° F. to produce methane, the reaction giving off heat, a small amount of carbon monoxide being defined as an insufficient amount to raise the temperature of the effluent gas from the methanation reaction to a temperature 50° to 100° F. above the temperature of the feed gas, the improvement comprising the steps of mixing with the feed gas a controlled amount of oxygen to catalytically burn a portion of the hydrogen to raise the temperature level of the gas following the methanation reaction, and passing said heated gas in heat exchange with the feed gas, the amount of oxygen added being sufficient to raise the temperature level of the reacted gas from 50° to 100° F. above the temperature of the feed gas.

5. In the process of claim 4, wherein oxygen is mixed with the synthesis feed gas prior to heat exchange with the reacted gas.

6. In a catalytic methanation process in a reactor vessel of an ammonia synthesis feed gas containing hydrogen, nitrogen and from 0.1 mol percent to 0.3 mol percent of carbon monoxide, wherein the hydrogen is catalytically reacted with the carbon monoxide at a pressure of about 100–400 p.s.i.a. and a temperature of from 300°–600° F. to produce methane, the improvement comprising the steps of introducing a controlled amount of oxygen into the reactor vessel catalytically to burn a portion of the hydrogen to raise the temperature level of the gas following the methanation reaction, and passing said heated gas in heat exchange with the feed gas, the amount of oxygen added being sufficient to raise the temperature level of the reacted gas from 50° to 100° F. above the temperature of the feed gas.

References Cited
UNITED STATES PATENTS 2,711,419   6/1955   Milbourne et al. _____ 260—499
3,088,919   5/1963   Brown et al. _____ 252—374

BERNARD HELFIN, *Acting Primary Examiner.*

LEON ZITVER, *Examiner.*

H. MARS, *Assistant Examiner.*